United States Patent [19]

Holladay

[11] Patent Number: 4,907,934

[45] Date of Patent: Mar. 13, 1990

[54] VARIABLE RATE BOAT LOADER

[76] Inventor: Brice R. Holladay, 9732 S.W. Siuslaw, Tualatin, Oreg. 97062

[21] Appl. No.: 288,075

[22] Filed: Dec. 21, 1988

[51] Int. Cl.$^4$ ............................................. B60P 3/10
[52] U.S. Cl. ....................................... 414/462; 224/310
[58] Field of Search ................. 224/310; 414/462, 786

[56] References Cited

U.S. PATENT DOCUMENTS

| | | | |
|---|---|---|---|
| 2,967,635 | 1/1961 | Barnett | 414/462 |
| 2,985,327 | 5/1961 | Gilkison | 414/462 |
| 3,042,240 | 7/1962 | Cline | 414/462 |
| 3,044,643 | 7/1962 | Shaw | 414/462 |
| 3,045,849 | 7/1962 | Tweten | 414/462 |
| 3,048,291 | 8/1962 | Mabry | 414/462 |
| 3,064,841 | 11/1962 | Ellingson | 414/462 |
| 3,066,815 | 12/1962 | Johnson | 414/462 |
| 3,072,274 | 1/1963 | Atwell | 414/462 |
| 3,128,893 | 4/1964 | Jones | 414/462 |
| 3,139,203 | 6/1964 | Borger | 414/462 |
| 3,155,257 | 11/1964 | Showler | 414/462 |
| 3,311,246 | 3/1967 | Jones | 414/462 |
| 3,363,788 | 1/1968 | Grosclaude et al. | 414/462 |
| 3,387,727 | 6/1968 | Micheel | 414/462 |
| 3,435,970 | 4/1969 | Sutton | 414/462 |
| 3,478,908 | 11/1969 | Clark | 414/462 |
| 3,612,314 | 10/1971 | Cooper | 414/462 |
| 3,696,953 | 10/1972 | Kim | 414/462 |
| 3,716,156 | 2/1973 | Risney | 414/462 |
| 3,777,922 | 12/1973 | Kirchmeyer | 414/462 |
| 3,836,029 | 9/1974 | Ruedebusch | 414/462 |
| 3,905,499 | 9/1975 | Speidel | 414/462 |
| 3,915,323 | 10/1975 | Underhill | 414/462 |
| 3,930,584 | 1/1976 | Davis et al. | 414/462 |
| 3,954,199 | 5/1976 | Grove | 414/462 |
| 3,999,673 | 12/1976 | Anderson | 414/462 |
| 4,024,971 | 5/1977 | Rohrer | 414/462 |
| 4,087,014 | 5/1978 | Schadle | 414/462 |
| 4,175,905 | 11/1979 | Garrison | 414/462 |

OTHER PUBLICATIONS

Electrolift Boat Loader Co. brochure.

Primary Examiner—Robert J. Spar
Assistant Examiner—Janice Krizek
Attorney, Agent, or Firm—Marger & Johnson, Inc.

[57] ABSTRACT

A variable rate boat loader includes a frame having transverse front, rear-powered and rear-pivot rollers. Two pulleys are mounted on the boat gunwales between the boat's bow and center of gravity. Two winch lines are connected at one end to the powered roller in laterally spaced position. Each line extends forward atop the vehicle, upward around the front roller, and back over the frame and lengthwise of the boat to the pulleys. The lines extend through the pulleys, forward to the frame, over the pivot roller to be supported thereby, and down to the stern of the boat. The lines are supportingly connected to the stern of the boat. This arrangement provides a doubled mechanical advantage in lifting the boat from the ground up to the level of the frame. From this level, as the effective load being lifted decreases, the mechanical advantage decreases while the lifting speed increases. The winch lines automatically bind the boat to the front roller and pivot roller when the boat is fully loaded.

14 Claims, 4 Drawing Sheets

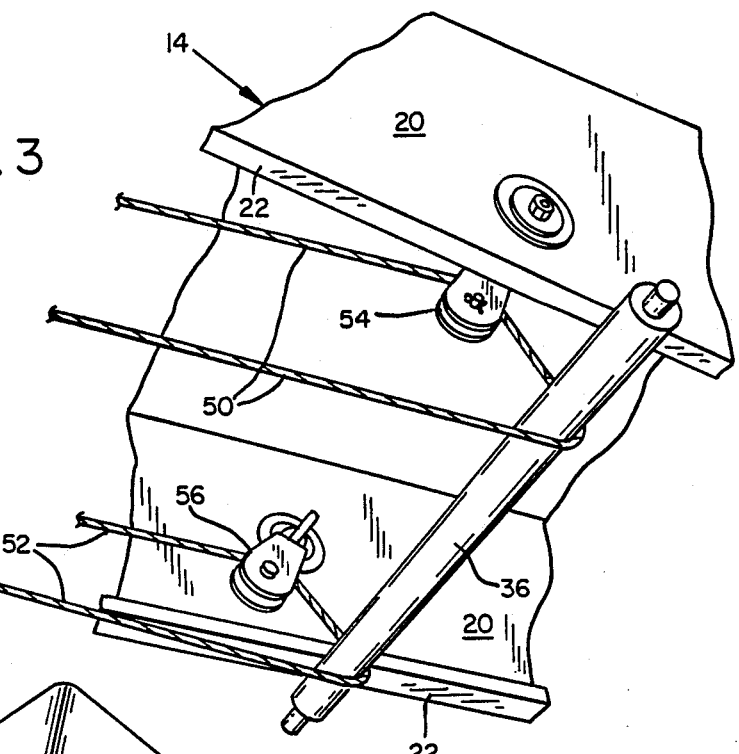
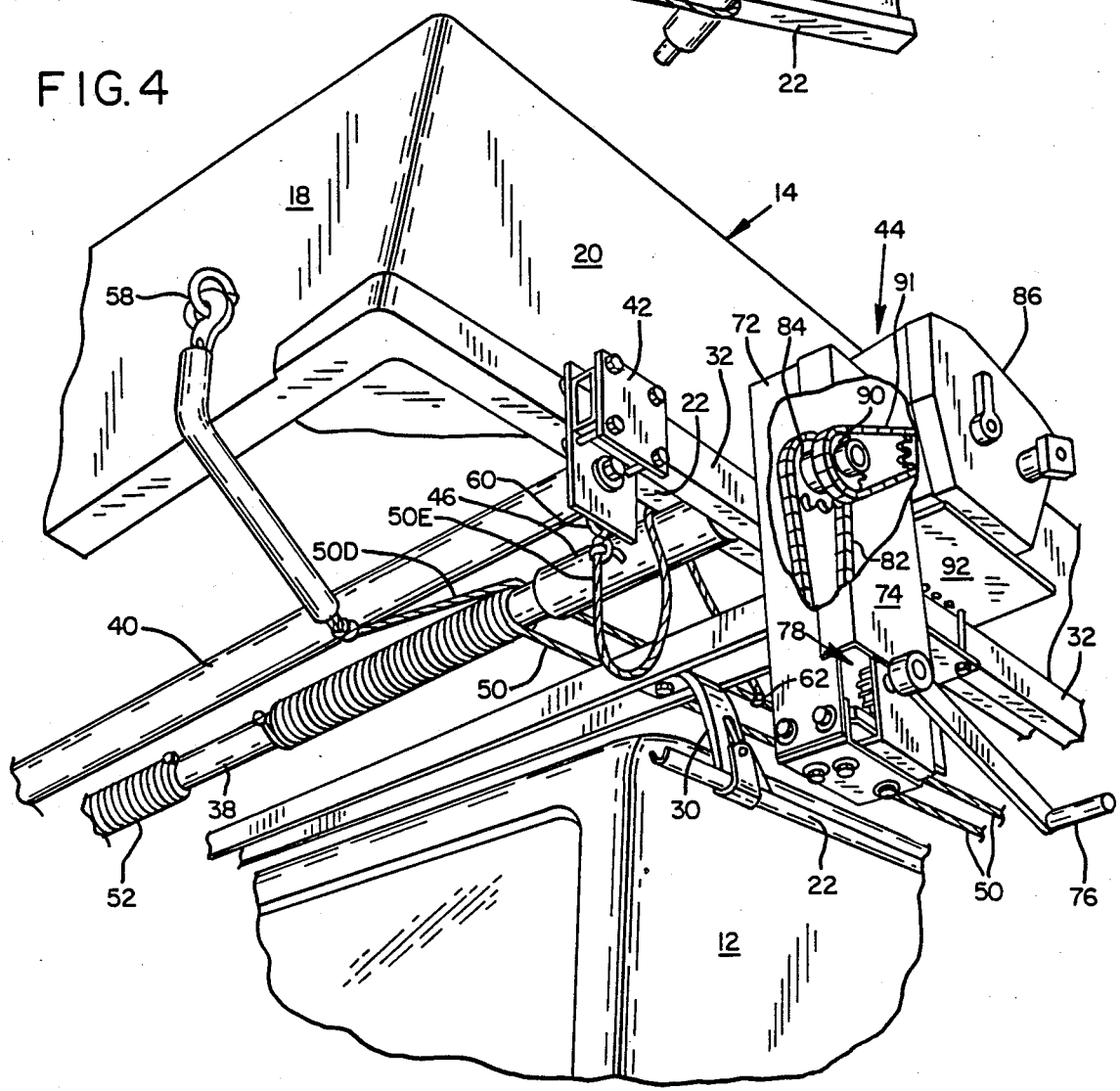

VARIABLE RATE BOAT LOADER

BACKGROUND OF THE INVENTION

This invention relates generally to vehicle top boat carriers and more particularly to automatic boat loading and unloading carriers.

A number of mechanisms have been invented for loading and carrying a lightweight fishing boat or similar object on top of a vehicle. Many of the early designs incorporate simple racks to support and carry the boat but offer little assistance for loading and unloading. Some of them (U.S. Pat. Nos. 3,042,240; 3,044,643; 3,066,815; 3,064,841; 3,072,274; 3,139,203; 3,155,257; 3,311,246; and 3,363,788) allow the operator to place or hoist one end of the boat up on a support member and then lift the other end and swing it into place. This eliminates the need to lift the entire load straight up at once, allowing a solitary operator to load heavier boats than would otherwise be possible.

Several of the early designs load the boat "semi-automatically" by means of mechanical lifting and turning mechanisms. They are more complicated, expensive to build and install than the foregoing racks, and lack flexibility. Some of these designs (U.S. Pat. Nos. 3,048,291 and 3,128,893) load a boat bow first in an upright position onto the top of a vehicle. Others of these devices (U.S. Pat. Nos. 2,967,635; 2,985,327; 3,435,970 and 3,478,908) load a boat from a position right side up on the ground and behind a vehicle to a position upside down on top of the vehicle in a more or less continuous motion. The latter, "up and over" technique requires considerable effort to raise and lower the boat and the effort required can vary dramatically during the course of loading and unloading. Also, once configured for a particular boat and vehicle combination, these systems are generally difficult to adapt and adjust for another boat or vehicle. Attempts to overcome these drawbacks have not succeeded.

U.S. Pat. No. 3,045,849 discloses an "up and over" system that uses pulleys, a pivoting arm which rises vertically from the center of the rack and articulated support arms to connect the stern of the boat to the rear of the vehicle not only to compound the leverage but also to change the direction of force applied to the loading lines.

A series of subsequent designs, shown in U.S. Pat. Nos. 3,696,953; 3,716,156; 3,777,922; 3,836,029; 3,905,499; 3,915,323; 3,930,584; 3,999,673 and 4,087,014, attempt to combine a winching arrangement with mechanical pivoting apparatus mounted at the rear of a vehicle to facilitate the "up and over" technique of loading. All of these are complicated, expensive designs and none are known to be in commercial production.

U.S. Pat. No. 3,387,727 shows the use of multiple pulleys on a continuous line arranged to provide different travel distances for a given amount of line travel. In this system, the boat must be manually inverted before loading and after unloading. This design, too, is complicated, cumbersome, expensive to build and difficult to install.

U.S Pat. No. 3,435,970 illustrates the use of flexible lines attached to the top, rear of the vehicle to support the stern of the boat above the ground rather than using the complicated mechanical support means employed by most of the early designs. A vertical pole supports a pulley above the center rear of the vehicle to help direct and thereby reduce the tension needed on a single pull line connected to the bow of the boat.

U.S. Pat. No. 3,612,314 somewhat simplifies the earlier designs but lacks the ability to automatically tie the stern of the boat down and requires the operator to manually stow the stern lines.

U.S. Pat. No. 3,954,199 provides for powering the rear support roller and adds a roller at the rear, about which the boat pivots. The additional pivot member offers some assistance in adjusting the unit for satisfactory operation in certain installations by providing an intermediate "break-over" stage in the arc described by the boat. This design ties the stern down inherently, but fails to tie the bow down and requires several steps to operate the unit, such as switching the crank mechanism between rollers at various stages of the process.

The Electrolift boat loader, commercially available since about 1974, incorporates some of the features of both U.S. Pat Nos. 3,612,314 and 3,954,199. It employs two rollers and ties the bow of the boat down but not the stern, as in the Cooper design (3,612,314). The stern support lines must be separately stowed. It utilizes a single bow line arrangement similar to the Grove design (3,954,199) but adds a spreader bar spanning the gunwales rearward of the bow. The lack of a separate pivot member renders this design difficult to adjust for satisfactory operation with certain vehicle and boat combinations.

U.S. Pat. No. 4,024,971 addresses the problem of tying the boat down all the way around as well as loading and unloading the unit in one continuous motion, and has been in commercial production. However, the line arrangement is complicated and requires that the length of the three line segments on each side be precisely coordinated with the location of the forward roller, pivot member, and the forward attaching points on the boat for proper operation and tie down. The unit is difficult to reconfigure once the line segments have been cut and braided back at each end and the entire assembly adjusted for a particular vehicle and boat.

U.S. Pat. No. 4,175,905 discloses an "up and over" loader set up so that the rear transverse member serves as both a roller and a line winch. A pair of lines extend around a front roller and back to a Y-line which is connected at two points on each gunwale of the boat. This arrangement is relatively simple but lacks the capability to automatically tie down the stern.

All of the above line-type loaders/unloaders incorporate a fixed mechanical advantage/line takeup ratio. This requires a compromise between loading/unloading effort and speed of operation. Significantly greater effort is required when first lifting the bow of the boat off the ground than in subsequent stages of the loading process. As the bow of the boat is elevated, the required effort diminishes greatly. In some designs, such as U.S. Pat. No. 3,836,029, the required force can reverse so that measures must be taken to keep the boat from crashing down onto the carrier. None of these designs optimizes the speed of operation as the required effort decreases.

Accordingly, a need remains for a boat loader that is simple, inexpensive, easy and safe to install and use, and can readily be adapted to different vehicles and boats.

SUMMARY OF THE INVENTION

One object of the invention is to provide an improved automatic boat loading and unloading system.

A second object is to make it easier to load a boat atop a vehicle with either a hand crank or motor.

Another object is to apply greater mechanical lifting advantage inherently, automatically, and without operator intervention, at those stages of the load/unload process where greater effort is required, and greater speed of operation at those stages of the process where the required effort is reduced.

Yet another object is to provide a simplified line routing arrangement yielding inherent front and rear tiedown of the boat with increased tolerance for variations in the length of line segments, support roller placement, and location of line attachment points on the boat.

A further object is to enable simpler, faster installation and adjustment of an automatic boat loader as well as quick and simple reconfiguration and readjustment for differing boats and/or vehicles.

The invention is a variable rate boat loading system and method by which a boat can be loaded and unloaded using the "up and over" technique.

The method begins by positioning the boat in an initial, unloaded position with the boat upright and a first, typically bow, end thereof located at a distance spaced apart from an end, typically the rear end, of the vehicle and a second, or stern, end of the boat adjacent the vehicle. A pulley is attached to the boat at a position between the first end of the boat and the center of gravity thereof. A winch means is fixed to the top of the vehicle and a first end of a winch line is connected to said winch means. The winch line is extended from the top of the vehicle lengthwise of the boat through the pulley and back to the top and end of the vehicle. The second end of the boat is supported from the top and end of the vehicle via a second end portion of the winch line. Pulling the winch line by the winch means causes the first end of the boat to rise while the second end pivots about a connection to the second end of the winch line. The pulley causes the winch line to exert a doubled mechanical advantage on lifting the boat until the pulley reaches the height of the winch means on top of the vehicle.

Continuing pulling the winch line as the height of the pulley exceeds the height of the winch means raises the boat to a point such that a midpoint of the boat contacts the vehicle. Until contact is made, the mechanical advantage exerted by the winch line decreases gradually from double toward unity and the speed of the motion relative to the amount of line pulled in by the winch means gradually increases in the same range of movement. Once the midpoint of the boat contacts the vehicle, the boat pivots about the midpoint and the mechanical advantage exerted by the winch line is unity.

Continuing to pull in the winch line tips the boat "up and over" until it is upside down and supported atop the vehicle. Tensioning the winch line secures the bow of the boat by the winch line exerting securing tension between the top of the vehicle and pulley and also secures the stern of the boat by the winch line exerting securing tension between the stern of the boat and the top of the vehicle.

The apparatus in which the foregoing method is implemented preferably includes a frame mounted atop the vehicle which comprises a pair of transverse frame members, preferably rollers, for supporting the boat. The rearward roller can be powered to serve as the winch, the winch line extending forward around the forward roller and then back to the pulley on the boat. This arrangement spaces the point from which the line is pulled toward the front of the frame so that the mechanical advantage exerted on the pulley decreases gradually from double toward unity as the pulleys rise above the forward roller. The frame can also include a third, pivot roller which serves as support means for the second end portion of the winch line during loading and as the rear tie-down for the boat when loaded.

The foregoing and other objects, features and advantages of the invention will become more readily apparent from the following detailed description of a preferred embodiment which proceeds with reference to the accompanying drawings.

BRIEF DESCRIPTION OF THE DRAWINGS

FIG. 3 is a perspective underside view of the front transverse roller of the loader/carrier of FIG. 1 with the boat loaded.

FIG. 4 is a perspective underside view of the rear transverse roller and roller drive assembly of the loader/carrier of FIG. 1 with the boat loaded.

DETAILED DESCRIPTION OF PREFERRED EMBODIMENT

Figure 1:
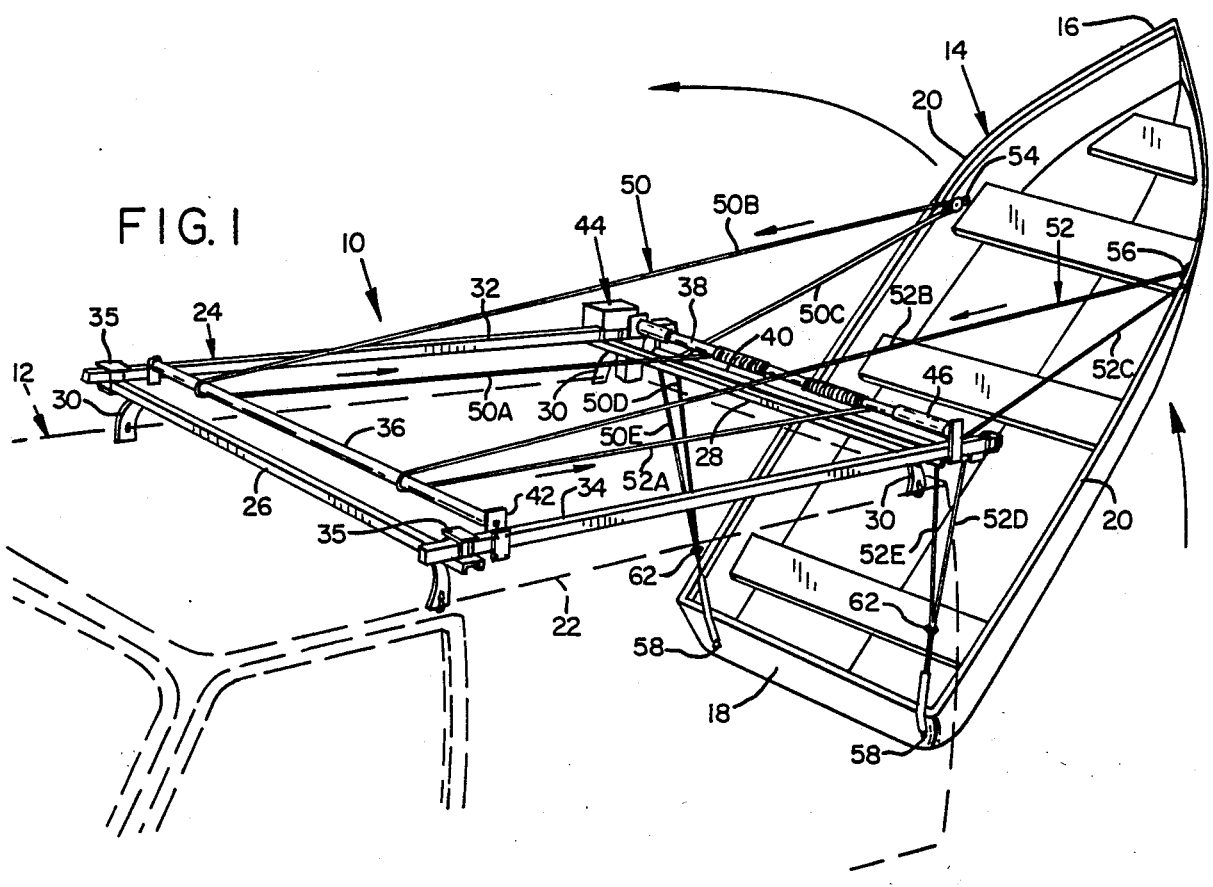
FIG. 1 is a frontal perspective view of an automatic boat loader/carrier mounted atop a vehicle for loading and unloading a boat using the "up and over" technique in accordance with the invention.

FIGS. 1 through 4 show a preferred embodiment of a loader/carrier 10 mounted atop a vehicle such as a van 12 for loading, carrying and unloading a boat 14 in accordance with the invention. The boat 14 conventionally includes a bow 16, a stern 18 and a pair of opposite gunwales 20. The vehicle 12 has a rooftop which conventionally includes a pair of opposite rain gutters 22, on which the loader/carrier 10 is mounted.

Figure 9:
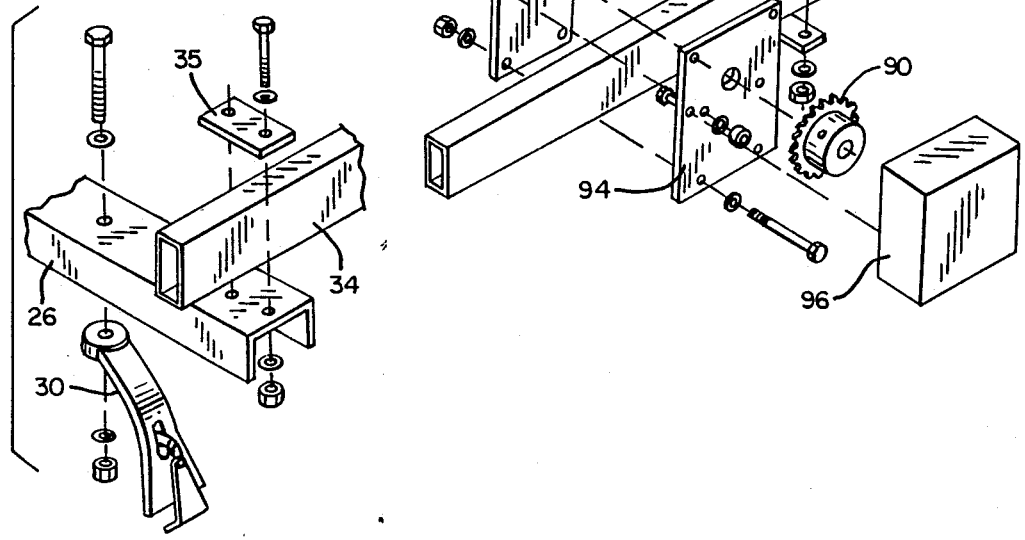
FIG. 9 is an exploded fragmentary perspective view of the carrier frame and mounting assembly of FIG. 1.

The loader/carrier 10 includes a frame 24 consisting of front and rear transverse frame members 26, 28 mounted to the rain gutters 22 of vehicle 12 by means of conventional gutter mounts 30 (see FIG. 9 for details) and right and left longitudinal members or side rails 32, 34 connected by clamps 35 to the transverse frame members.

Three transverse supporting rollers 36, 38 and 40 are mounted along the longitudinal side rails 32, 34 of frame 24. Front roller 36 is connected near front transverse member 26 by means of a pair of bearing end brackets 42 clamped on the upper side of members 32, 34 for adjustable longitudinal positioning therealong. Rear pivot roller 40 is similarly connected at the rear ends of the side rails 32, 34 by a pair of brackets 42. These brackets are shown inverted to position the pivot roller on the lower side of members 32, 34, but for some installations may be oriented rearward to position the pivot roller in the same plane as the side rails, or turned upward to position the pivot roller above the side rails.

Roller 38 is similarly mounted above the side rails just forward of pivot roller 40.

Figure 10:
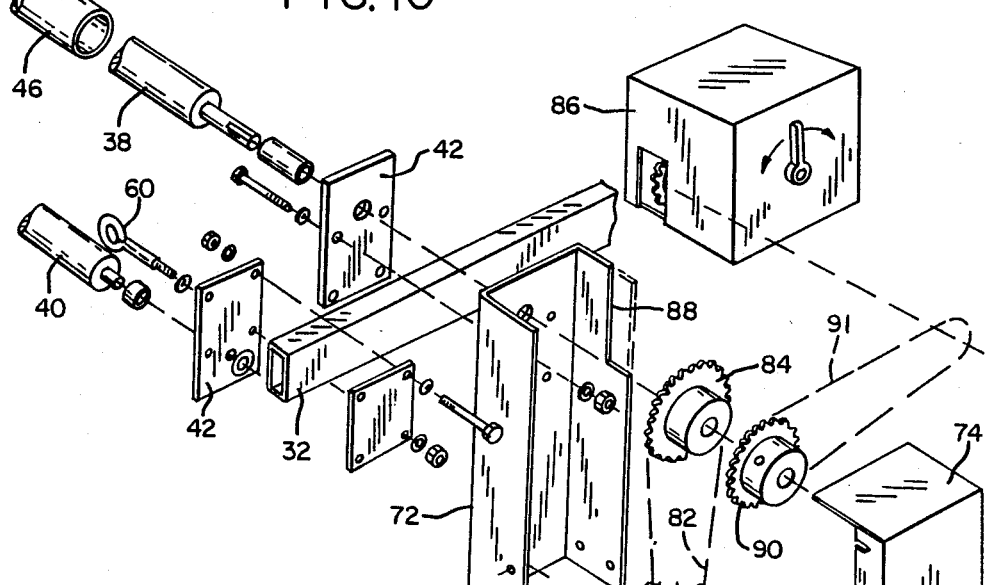
FIGS. 10 and 11 are exploded fragmentary perspective views of alternative roller drive/winch assemblies for the apparatus of FIGS. 1 and 4.
Figure 11:
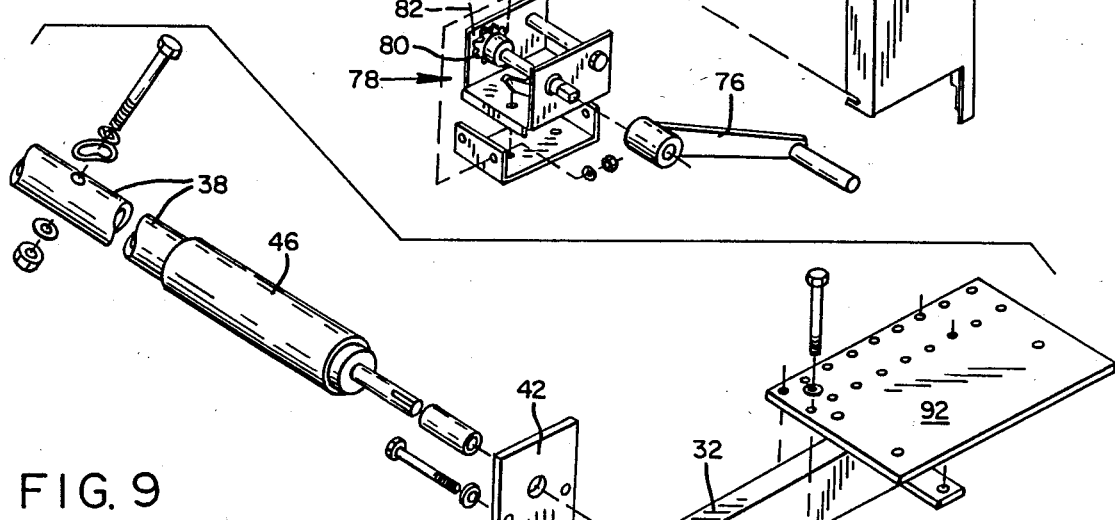

Upper rear roller 38 is driven bidirectionally by a drive assembly 44, further detailed in FIGS. 10 and 11. A pair of rubber drive sleeves 46 are received on the power roller and spaced apart to pad and frictionally contact and thereby impart driving traction to the gunwales of the boat.

The loader/carrier 10 includes a novel line arrangement that utilizes a pair of continuous lines 50, 52. The preferred line arrangement is diagrammed in FIG. 5. Each line 50 is connected to driven roller 38; extends forward (sections 50A, 52A) under and around front roller 36 (or optional pulleys); and extends rearward (sections 50B, 52B) over frame 24 to pulleys 54, 56 mounted inside each gunwale 20 of the boat. A first bite of the winch lines passes around the pulleys. Then, the line (sections 50C, 52C) extends back to the pivot roller 40, which supports a second bite of the lines at the top rear of the vehicle and loader carrier frame, and continues down to connectors 58 at the stern of the boat (sections 50D, 52D). In this preferred embodiment, a fifth section of each line (sections 50E, 52E) extends upward from the connectors 58 to connectors 60 on the rear of the carrier frame. The length of the fifth section is fixed by knotting it to the fourth section either at connector 58 or at a midpoint between the connectors, e.g. by knot 62, or both. Using knot 62 at a midpoint also serves to self-stow the fifth line sections when the boat is loaded (see FIG. 4). In alternative embodiments, the fifth sections may be connected differently or omitted altogether, as described below, yet provide the same function as the preferred embodiment.

Pulleys 54, 56 are removably attached inside the gunwales of boat 14 at a point forward of the center of gravity CG and substantially toward the bow. Connectors 58 include a pair of eyebolts spaced apart in the transom of stern 18 and a clip-type fastener having an eye through which the lines are inserted and by which the line can be detachably fastened to the eyebolts. Connectors 60 are suitably eyebolts in the rear ends of the side rails to which the rope sections 50E, 52E can be tied.

Figure 5:
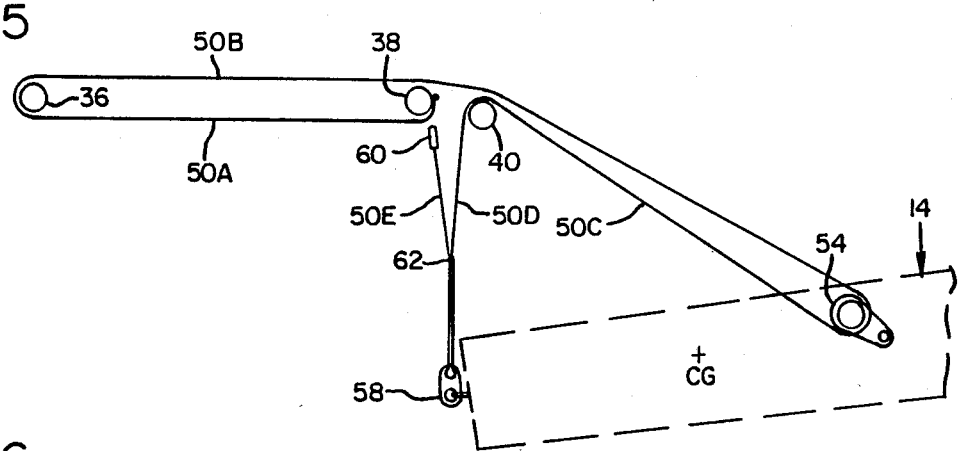
FIGS. 5–8 are fragmentary side elevation views similar to FIG. 2 showing variations in the line arrangement for variable rate loading in accordance with the invention.
Figure 6:
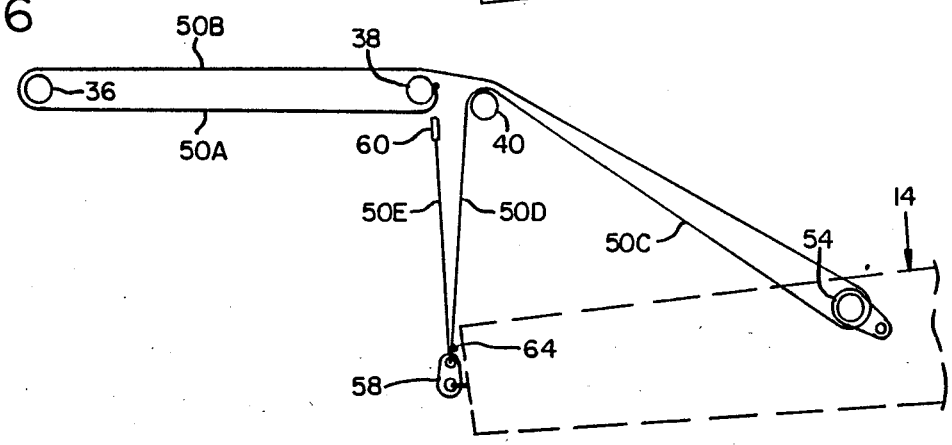
Figure 7:
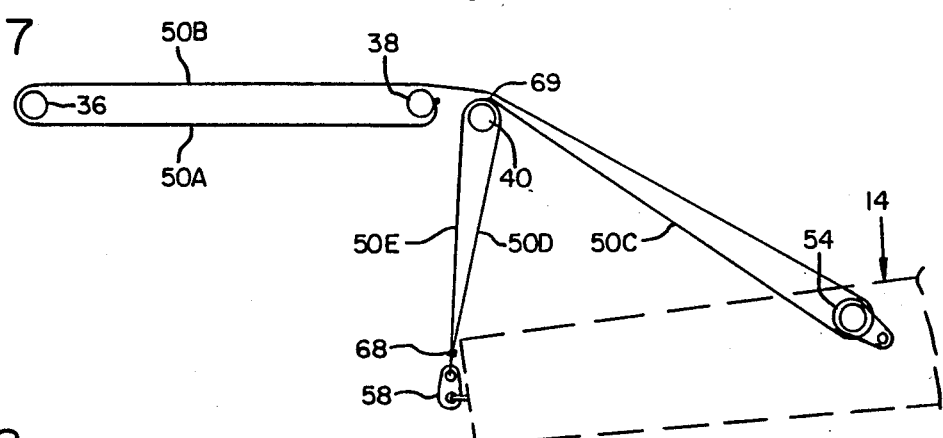
Figure 8:
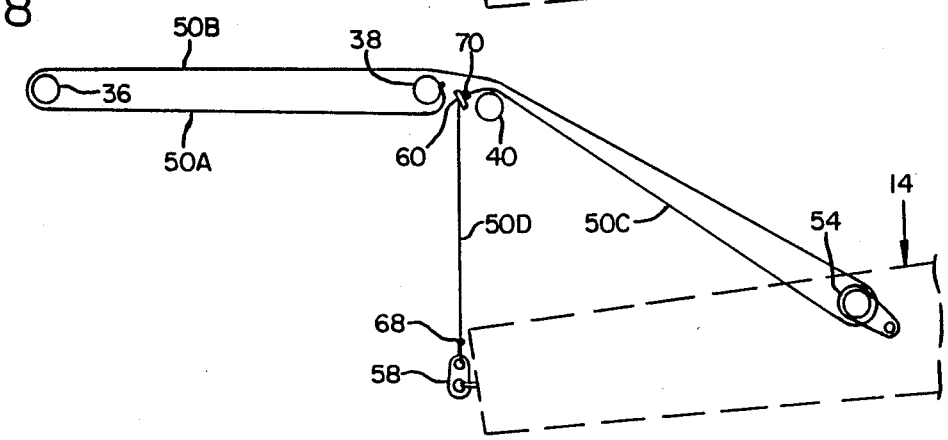

The line arrangements depicted in FIGS. 6, 7, and 8 are functionally equivalent to that represented by FIG. 5. Each of them uses the same concept of a continuous line, and the lines are arranged in identical fashion through the first four segments of each. The differences arise in the manner of connection of the stern sections of the lines to the frame of the loader carrier.

The arrangement shown in FIG. 6 has the fifth section 50E but does not connect the fifth and fourth sections together. Instead this arrangement utilizes a ring 64 or other in-line mechanism to join the fifth line section 50E in line to the fourth section 50D in a manner which permits line section 50E to slide in the eye in the clip-type fastener of connector 58 attached to the stern but prevents line section 50D from sliding past the eye of the fastener.

The arrangement of FIG. 7 does not connect the fifth line section 50E to a connector 60 on the loader/carrier frame as in the foregoing embodiments but supports the stern from pivot roller 40 by tying or braiding the end 69 of the fifth section back into the fourth section where the latter section passes around roller 40. Thus, the last two sections form a closed loop around roller 40 and may be tied at a knot 68 at connector 58.

The arrangement in FIG. 8 does not have a separate fifth section but combines the stern supporting function of such section into the fourth section. The end of the line is tied to the eye of the fastener of connector 58 by a knot 68. This arrangement utilizes a ring 70 or other in-line mechanism to join the fourth section 50D in-line with the third line section 50C in a manner which restricts the third line section 50C from sliding through an eyebolt (such as connector 60) or other capture mechanism mounted to the side rail of the loader/carrier frame in the approximate vicinity of pivot roller 40.

Each embodiment of line arrangement thus provides means coupled in-line to the lines 50, 52 for supporting the stern of the boat from the loader/carrier frame during loading and unloading. The line arrangements shown in FIGS. 5 through 8 are readily adapted to work with a two roller system (i.e., one lacking a pivot roller 40). This can be done by substituting for the rear pivot roller 40 an eyebolt (e.g, eyebolt 60), pulley or other means of capturing a bite in the third and fourth line sections 50C, 50D at a point approximately where pivot roller 40 would normally be mounted to the side rail of frame 24.

Referring to FIGS. 10 and 11, the drive assembly 44 can take a number of different forms. FIGS. 4 and 10 show a form that is either manual or dual manual/electric drive. This form has a vertically elongate rectangular housing 72, 74 mounted on the outer side of side rail 32 in alignment with driven roller 38. A manual cranking mechanism with a hand crank 76 and an anti-reversing ratchet drive 78 is mounted in a lower portion of the housing. The ratchet drive is spring loaded to a normally engaged position and manually disengageable for unloading a boat. This drive includes a 10-tooth sprocket 80 which is connected by a chain 82 to a 30-tooth sprocket 84 keyed on the shaft end of roller 38. Optionally, a reversible 12 VDC electric motor 86 with clutch drive is mounted on a platform 92 (FIG. 4) on the side rail 32 alongside an upper portion of housing 72 in the location of cutout 88. The motor is coupled to the shaft of roller 38 by a third 24-tooth sprocket 90 and a second drive chain 91.

Alternatively, as shown in FIG. 11, the manual drive and housing can be omitted. The electric motor 86 is mounted alongside a smaller housing 94, 96 which encloses a single sprocket 90. The same electric motor drive is used in both versions. The motor drive is suitably a commercially available 1500 lb. vertical lift capacity winch, having a clutch and dynamic braking, modified by removal of the cable spool and associated ring gear and mounting of a 12 tooth drive sprocket on the final, geared-down drive shaft from the motor. This sprocket drives sprocket 90 via chain 91.

OPERATION

Figure 2:
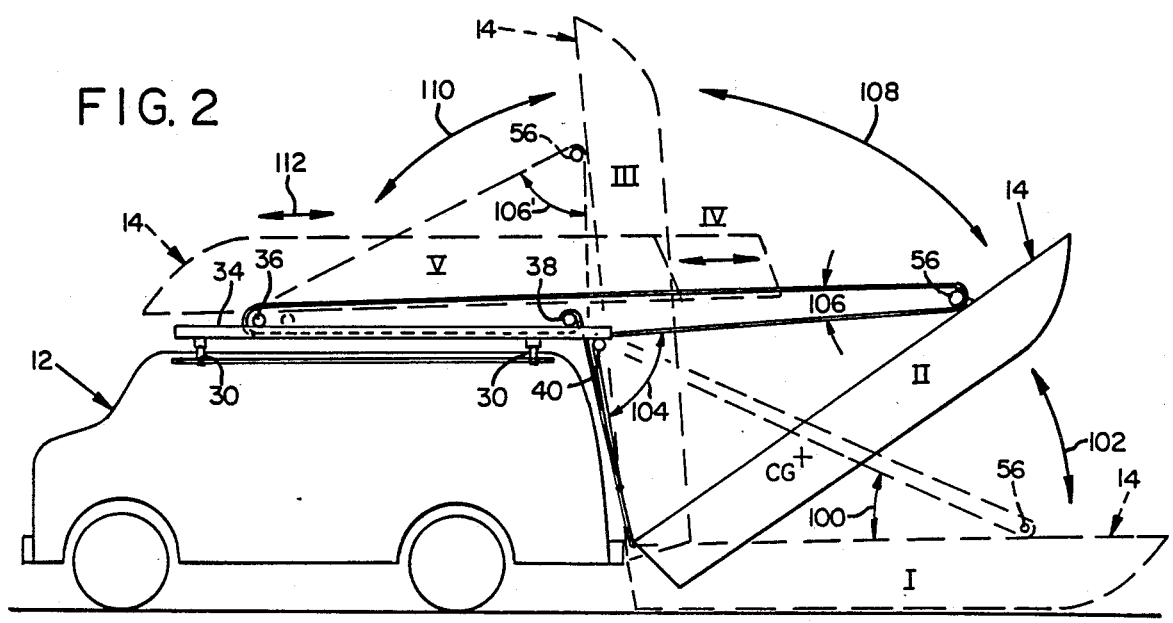
FIG. 2 is a side elevational view of the apparatus of FIG. 1 showing the boat in dashed lines in various stages of loading.

Referring to FIG. 2, loading a boat begins with the boat aligned on the ground behind the vehicle with its stern facing the back of the vehicle, as shown at position I in dashed lines. Lines 50, 52 are attached to the pulleys 54, 56 on the boat as shown in FIGS. 1 and 5. The stern of the boat is supported by line sections 50E, 52E. The drive assembly is actuated to begin winching the first line sections onto driven roller 38, which is rotated counterclockwise (in the view of FIG. 2) at a constant rate.

Briefly, the foregoing line arrangements all provide a variable rate of loading during successive stages of the loading cycle. For a given rate of rotation and torque applied to roller 38, the described line arrangements effectively double the force applied to pulleys 54, 56 by line sections 50B, 52B, with a corresponding reduction in the speed at which the pulleys travel, for a limited portion of the load cycle. The applied force is then gradually reduced toward unity, with a corresponding increase in speed for a limited portion of the cycle. The applied force and speed remain approximately constant for the remainder of the load sequence.

Initially, the load of lifting the boat from the ground is greatest, because of the small angle 100 between the length of the boat and the direction of pull exerted by the lines 50, 52. Line sections 50A, 52A and 50B, 52B are taken up at a constant rate while line sections 50C, 52C are taken up at a rate equal to ½ that of line sections 50A, 52A as a result of passing through pulleys 54, 56. The resultant total force exerted on pulleys 54, 56 is effectively twice that exerted on line sections 50A, 52A. The line arrangement thus doubles the force that can be applied in lifting the boat during the initial phase. It continues to do so throughout the portion of the arc described by arrow 102, i.e., until the boat is raised to position II shown in solid lines in FIG. 2, at which point the lines 50, 52 are positioned as indicated by arrow 104, nominally horizontal. Meanwhile, the load exerted on line sections 50B, 50C and 52B, 52C by the weight of the boat decreases trigonometrically as angle 100 increases.

As the bow of the boat is raised through arc 108 and while angle 104 increases, angle 106 between the line segments remains approximately equal to zero until pulleys 54, 56 reach a point, shown in solid lines, approximately level with rear support roller 38. At this point, angle 106 begins to increase (see angle 106') as angle 104 further increases. As angle 106' increases, the speed at which pulleys 54, 56 travel, relative to the rate of take-up on line sections 50B, 52B, increases and the resultant total force applied to the pulleys decreases from two-to-one. This speed/force ratio continues to vary as angle 106' increases until the boat is upright and its gunwales contact the rear pivot roller 40, as shown in dashed lines at position III. At this point, the length of line sections 50C, 52C becomes approximately constant, resulting in the pulleys traveling at a constant speed with constant force applied by line sections 50C, 52C. In other words, the pulley multiplication of winching force is unity.

Continuing to draw in line sections 50C, 52C results in the boat rotating through arc 110 about the rear pivot roller 40 and then drive roller 38 until the bow comes to rest on the front roller 36 in position IV. As soon as the gunwales of the boat contact the rear pivot roller, the load is reduced as the boat's pivot point shifts from its stern to the point where its gunwales contact the pivot roller.

The boat is then drawn forward (arrow 112) to a point, represented by position V, where pulleys 54, 56 are approximately even with front roller 36. The bow of the boat is bound to the front roller 36 by line sections 50B, 52B passing through pulleys 54, 56 and around front roller 36, as shown in FIG. 3. The stern is bound to the rear pivot roller 40 by line sections 50D, 52D passing under rear pivot roller 40 and attached to the stern 18 of boat 14 at connectors 58 as shown in FIG. 4. The line sections 50E, 52E are self-stowed by knot 62.

Unloading the boat is accomplished by reversing the above procedure. Referencing FIG. 2, the power roller 38 is rotated clockwise. The boat is driven rearward by friction between the power roller 38 and the gunwales of the boat until the center of gravity of the boat passes rearward of the power roller (position IV), allowing the stern of the boat to tip toward the ground. The boat continues to rotate about power roller 38 and pivot roller 40 until it is supported by line sections 50E, 52E. Continued clockwise rotation (in FIG. 2) of the power roller will move the boat successively through positions III and II until it comes to rest on the ground in position I.

It can be seen from the above description that, for a constant rate of rotation and torque applied to power roller 38, the arrangement of lines 50, 52 provides for inherently greater force applied to the forward section of the boat when first lifting the boat off the ground and inherently greater speed once the boat is tilted upright and minimal forces are required. These changes in speed and force occur inherently and automatically without operator intervention required.

Referring to FIGS. 3 and 4, it can also be seen that the position of front roller 36 with respect to the boat attachment points for pulleys 54, 56 is not critical for purposes of binding the boat to the mechanism automatically. This eliminates the need for precise calculation of the lengths of the lines, the location of attachment points for the pulleys and the location of front roller 36 and pivot roller 40. The pulleys 54, 56 can be positioned freely forward of the boat's center of gravity. Different length boats can be loaded and tied down by a simple adjustment in the position of front roller 36 because all of the line sections from the winch roller 38 to the connectors 58 at the stern of the boat are essentially self-adjusting. Additionally, line sections 50D, 52D can be a continuous extension of line sections 50E, 52E with a simple half knot 62 to capture the hook of connector 58, allowing the use of a single continuous line for each side. This significantly reduces the installation and adjustment time required by previous designs.

Having illustrated and described the principles of my invention in a preferred embodiment with several variations, it should be apparent to those skilled in the art that the invention can be modified in arrangement and detail without departing from such principles. I claim all modification within the scope and spirit of the following claims.

I claim:

1. A boat loader/carrier for loading a boat onto a top of a vehicle, wherein the boat in its unloaded initial position has a first end thereof located at a distance spaced apart from an end of the vehicle and a second end thereof located adjacent the end of the vehicle, the boat having a center of gravity positioned between the first and second ends, the loader/carrier comprising:

a continuous winch line;

winch means mounted atop the vehicle for pulling in the winch line;

pulley means attached to the boat at a point between the first end of the boat and the center of gravity thereof for engaging a first bite of the winch line;

a winch line connector mounted at the second end of the boat for detachably connecting the winch line thereto; and support means mounted atop the vehicle at the end thereof for supporting a second bite of a winch line; and the winch line extending continuously from the winch means atop of the vehicle lengthwise of the boat through the pulley means and back to the support means and thence to the winch line connector at the second end of the boat, such that operation of the winch means to pull in the winch line raises the first end of the boat toward the end of the vehicle with a doubled mechanical advantage until the pulleys rise above the elevation of the support means and thereafter raises the first end at reduced mechanical advantage less than the doubled mechanical advantage.

2. A boat loader/carrier according to claim 1 in which the winch line includes a first section extending to the pulleys and a second section extending back to the support means, the first and second sections being parallel when the pulleys are below the support means and forming an included angle at the pulleys that is greater than zero when the pulleys are above the support means.

3. A boat loader/carrier according to claim 1 further comprising a frame mounted atop the vehicle including a forward roller and a rearward roller extending transversely of the winch line for supporting the boat, the rearward roller being driven to serve as said winch means and the winch line extending forward therefrom around the forward roller and back over the rearward roller to the pulleys on the boat.

4. A loader carrier according to claim 3 in which the winch line and rollers are arranged such that the rollers support the boat and the winch line ties down the first end via the forward roller and the second end via the support means when the boat is loaded atop the frame.

5. A loader carrier according to claim 1 further comprising a frame mounted atop of the vehicle including a pivot roller located adjacent the end of the vehicle and extending transversely of the winch rope to serve as said support means, the winch line extending from said pulley means around the pivot roller and downward to the winch line connector.

6. A loader/carrier according to claim 1 further comprising a frame including said support means mounted atop of the vehicle and including means defining a support line connected to the frame at the end of the vehicle and to the second end of the boat, for supporting the second end of the boat.

7. A loader/carrier according to claim 6 wherein the support line is connected in-line to the winch line.

8. A loader/carrier according to claim 6 wherein the support line is a continuous extension of the winch line.

9. A loader/carrier according to claim 6 wherein the support line is coupled to the winch line and frame in a manner such that the support line has a fixed effective length for supporting the second end of the boat during loading and unloading and is retractable by the winch means when the boat is loaded to secure said second end to the frame via the support means.

10. A loader/carrier according to claim 1 further comprising hand drive means and powered drive means connected to the winch means for selectively driving the winch means.

11. A loader/carrier according to claim 1 further comprising a frame mounted on the top of the vehicle including a forward roller and a rearward roller, the rearward roller being driven to define said winch means and the winch line extending forward therefrom and around the forward roller and back over the rearward roller, and further including a pivot roller located adjacent the end of the vehicle to define said support means, the winch line extending forward from said pulley means around the pivot roller and downward to engage the winch line connector on the second end of the boat.

12. A loader/carrier according to claim 11 further comprising a support line connected to the frame and to the second end of the boat for supporting the second end of the boat, the support line being coupled in-line to the winch line.

13. A loader/carrier according to claim 12 in which the support line is slidably connected to the frame so that when the boat is loaded the winch pulls the support line taut around the pivot roller.

14. A load/carrier according to claim 11 including a pair of said winch lines laterally spaced apart on said frame and connected to the boat by a pair of said pulley means, one pulley means mounted on each gunwale of the boat.

* * * * *